United States Patent [19]

Schwartz et al.

[11] Patent Number: 4,847,945

[45] Date of Patent: Jul. 18, 1989

[54] DISMANTLABLE WHEEL ATTACHMENT MECHANISM WITH SWIVEL JOINT PROTECTOR

[75] Inventors: Leo Schwartz, Montreal; David Hall, Laurent, both of Canada

[73] Assignee: Dorel Industries, Inc., Montreal, Canada

[21] Appl. No.: 194,183

[22] Filed: May 16, 1988

[51] Int. Cl.⁴ .............................................. B60B 33/02
[52] U.S. Cl. ...................................... 16/30; 16/35 R; 16/36; 16/44; 280/47.38
[58] Field of Search .................. 16/30, 35 R, 36, 42 T, 16/43, 44; 280/47.38, 650, 658

[56] References Cited

U.S. PATENT DOCUMENTS

| | | | |
|---|---|---|---|
| 1,232,688 | 7/1917 | Johnson | 16/36 X |
| 2,847,696 | 8/1958 | Kramcsak, Jr. | 16/36 X |
| 3,758,917 | 9/1973 | Schroer | 16/36 |
| 4,494,271 | 1/1985 | Perlin et al. | 16/30 X |
| 4,575,896 | 3/1986 | Nakao et al. | 16/35 R |
| 4,608,729 | 9/1986 | Huang | 16/35 R |
| 4,731,899 | 3/1988 | Huang | 16/35 R |

*Primary Examiner*—Fred A. Silverberg
*Attorney, Agent, or Firm*—Burns, Doane, Swecker & Mathis

[57] ABSTRACT

An improved wheel attachment mechanism for securing wheels to a child vehicle, such as a stroller or a carriage. The mechanism comprises a leg attachment member which is removably securable to a leg of the vehicle. An intermediate housing is removably secured to the leg attachment member and has a support surface for mating frictional engagement with an abutment wall of the leg attachment member to form a swivel joint to permit swivelling of the leg attachment member about a swivel post. The swivel joint is protected by an inverted cup member. A wheel axle housing is also removably secured to a suspension portion of the intermediate housing whereby the entire attachment mechanism may be dimantled by removable fasteners for servicing or repair of the wheel attachment mechanism.

8 Claims, 2 Drawing Sheets

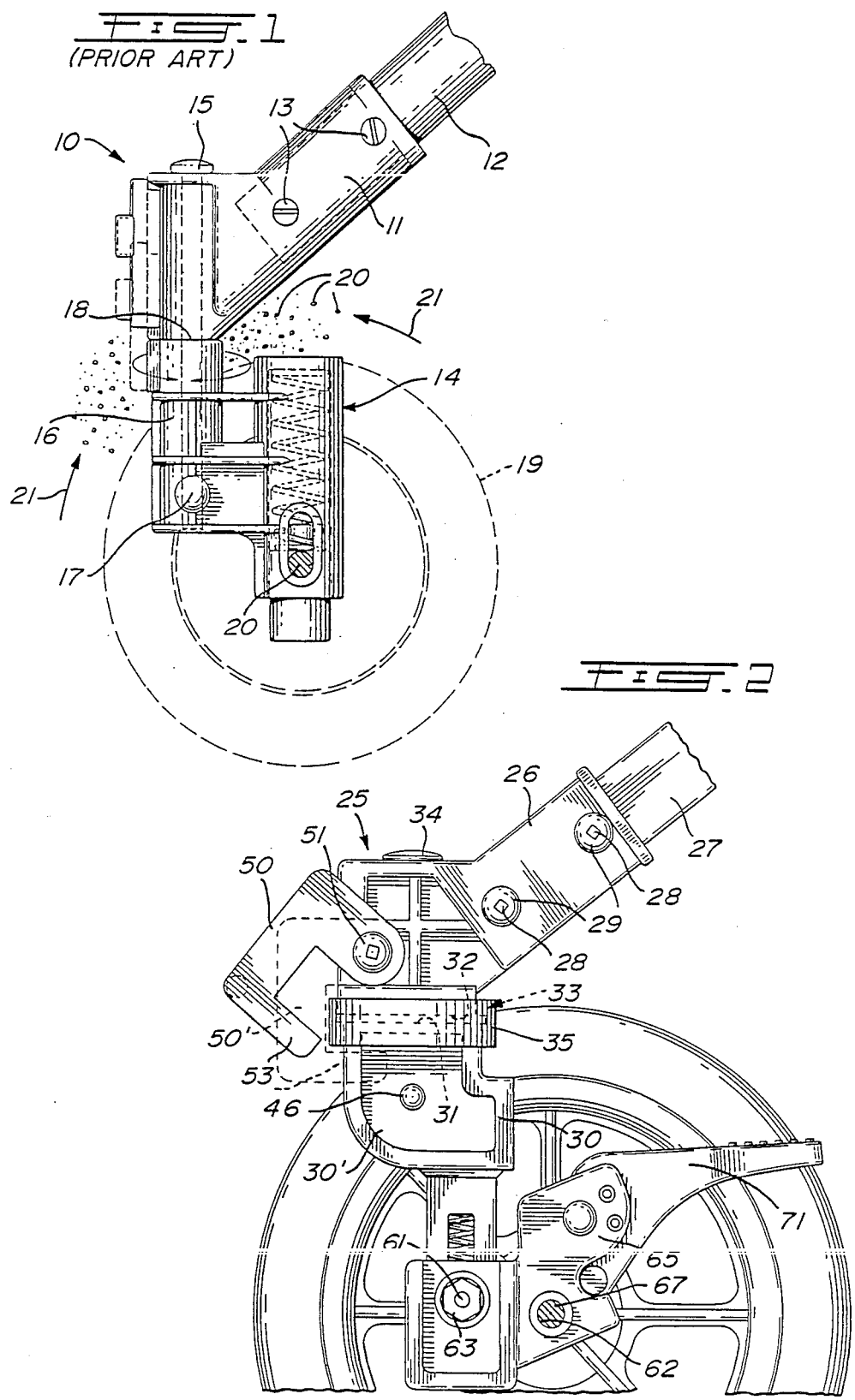

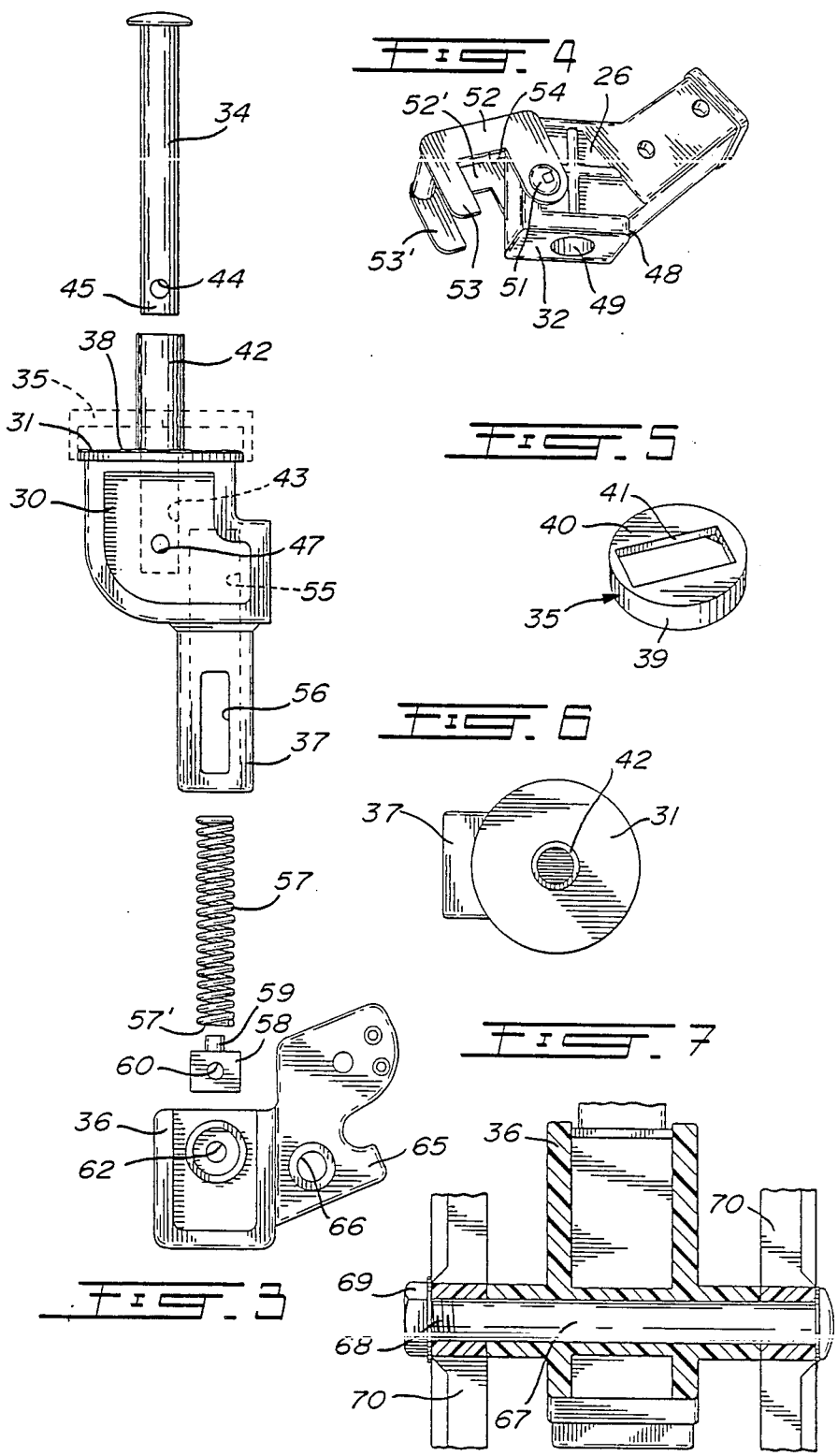

DISMANTLABLE WHEEL ATTACHMENT MECHANISM WITH SWIVEL JOINT PROTECTOR

BACKGROUND OF INVENTION

1. Field of Invention

The present invention relates of an improved wheel attachment mechanism for child vehicles, such as a stroller or carriage, and wherein the swivel joint of the mechanism is surrounded by a protective member to prevent foreign matter from clogging the joint, and further wherein the wheel attachment mechanism may be dismantled by removable fasteners for servicing the mechanism or attaching replacement parts.

2. Description of Prior Art

Known child vehicle wheel attachment mechanisms of the prior art, and specifically of the type wherein there is provided a swivel joint so that the wheels are supported in a swivel manner, are all constructed with the parts permanently secured to one another and to the legs of the child vehicle frame. A disadvantage of this is, seeing that such vehicles are normally supported on four sets of wheels, that as soon as one set of wheels is defective the entire vehicle, stroller or carriage, is returned to the merchant and then back to the manufacturer for repair. This is cumbersome as fairly large articles must be handled by the merchants and thus make it costly to handle, ship and store, which adds to the repair cost that is passed on to the user if the defect occurred after the warranty period, as is usually the case.

Another disadvantage of this prior art type of wheel attachment mechanism is that the swivel joint is usually located immediately above the wheels where mud, dust, sand and water is projected by the wheels, thus causing rapid wear of the parts in the joint area where materials are continuously rubbing against one another. This wear eventually leads to the loosening of parts and breakage. Still further, the axle of the wheels is normally secured by immovable fasteners and this wears down the wheels in the axle area once foreign matter enters that area. In conclusion, because of such construction, it has not been possible for the users to perform periodic maintenance of the wheel attachment mechanisms of such vehicles, and such as replacing, cleaning and lubricating the component parts. If the part wears down or breaks due to a construction defect, the user cannot effect the repair himself and must return the entire vehicle to the manufacturer. Thus, the user may be absent of his vehicle for a long period of time making it awkward to handle a child during that period of repair by the manufacturer, as such vehicles are indispensible for young infants.

SUMMARY OF INVENTION

It is a feature of the present invention to provide an improved wheel attachment mechanism which substantially overcomes all of the above-mentioned disadvantages of the prior art.

Another feature of the present invention is to provide a wheel attachment mechanism wherein the swivel joint of the mechanism is protected against the entry of foreign matter.

Another feature of the present invention is to provide a wheel attachment mechanism which is completely dismantlable whereby the user can clean or lubricate all the parts or effect the replacement of any of the parts.

Another feature of the present invention is to provide a wheel attachment mechanism which is easily detachable from a child vehicle frame thus resulting in a shipping container for the carriage which is of smaller size making it more economical to ship and package.

Another feature of the present invention is to provide a wheel attachment mechanism which permits periodic maintenance to be effected by the user thereby prolonging the life of the mechanism and the child vehicle to which it is secured, and thus limiting the need to return the entire vehicle to the supplier for repair.

According to the above features, from a broad aspect, the present invention provides a wheel attachment mechanism for securing wheels to a child vehicle, such as a stroller or a carriage. The mechanism comprises a leg attachment member removably securable to a leg of the vehicle. An intermediate housing is removably secured to the leg attachment member, and has a support surface for mating frictional engagement with an abutment wall of the leg attachment member to form a swivel joint to permit swiveling of the leg attachment member about a swivel post. Means is provided for protecting the joint from foreign matter. A wheel axle housing is also removably secured to a suspension portion of the intermediate housing.

BRIEF DESCRIPTION OF DRAWINGS:

A preferred embodiment of the present invention will now be described with reference to the example thereof as illustrated in the accompanying drawings in which:

FIG. 1 is a perspective view of a wheel attachment mechanism of the prior art;

FIG. 2 is a fragmented side view illustrating the wheel attachment mechanism of the present invention;

FIG. 3 is an exploded view of the intermediate housing and wheel axle housing forming part of the wheel attachment mechanism of the present invention;

FIG. 4 is a perspective view of the leg attachment member;

FIG. 5 is a perspective view of the joint protector cup;

FIG. 6 is a top view of the intermediate housing showing the support wall; and

FIG. 7 is a simplified fragmented section view showing a portion of the wheel axle housing with the wheel axle passing therethrough.

DESCRIPTION PREFERRED EMBODIMENTS

Referring now to FIG. 1, there is shown generally at 10 a wheel attachment mechanism of the prior art and constituted by a leg attachment member 11 which is secured to a tubular leg member 12 by means of rivet fasteners 13. The leg attachment member 11 is secured to a shock damping housing member 14 about a swivel pin 15 which is secured in a swivel support post 16 by means of a further rivet 17. A swivel joint 18 is formed between the leg attachment member and the support post 16. A wheel 19 is supported on a wheel axle 20 which is also permanently secured to the wheels. Accordingly, all the parts are secured together by fasteners which can only be removed by drilling them out, and this is usually done by the manufacturer if any repair is required to the wheel attachment mechanism.

A disadvantage of the mechanism as shown in FIG. 1 is that, during the operation of the vehicle when the wheel is turning, foreign particles 20 is thrown in the direction of the joint 18 by the rotation motion of the wheel in the direction of arrows 21. These dust particles lodge themselves within the joint 18 and cause wear of the joint causing the entire wheel attachment mechanism to loosen. Also, when the rivets wear out all the parts become loose and cause further damage.

Referring now to FIGS. 2 to 7, there is shown generally at 25 the wheel attachment mechanism of the present invention, and it also comprises a leg attachment member 26 which is removably secured to a leg 27 of a stroller carriage vehicle, but in this particular instance, it is secured by removable fasteners such as bolts 28 having removable lock nuts 29. An intermediate housing 30 is also removably secured to the leg attachment member 26 and has a joint support surface 31, herein a circular surface, for mating frictional engagement with an abutment wall 32 of the leg attachment member to form a swivel joint 33 to permit swiveling of the leg attachment member 26 on the support surface 31 and about a swivel post or pin 34. Seal means in the form of an inverted rubber cup 35 is provided to protect the joint against foreign particles, such as particles 20 in FIG. 1. A wheel axle housing 36 is also removably secured to a suspension portion 37 of the intermediate housing 30.

A lubricant material, such as lubricating grease 38, may be interposed between the support surface 31 and the abutment wall 32 to constitute a lubricated joint 33. The inverted cup 35 is better illustrated in FIG. 5, and is provided with a circumferential circular side wall 39 depending from a circular top wall 40. An opening 41 is provided in the top wall 40, and is configured to receive the outer peripheral portion of the leg attachment member in close fit therein to prevent foreign matter from entering into the joint. The cup 35 may be constructed of suitable rubber or plastics material.

As can be seen in FIG. 3, a hollow tubular bushing 42 extends vertically above the support surface 31 and receives the pivot bolt or pin 34 therethrough and into a cavity 43 provided in the intermediate housing 30. The pivot pin 34 has a through bore 44 adjacent a free end 45 thereof for receiving a removable fastener 46 (see FIG. 1) therethrough, and extending through a through bore 47 provided in the housing 30. A lock nut removably secures the fastener 46 whereby to permit disconnection of the leg attachment member from the intermediate housing for servicing and repair thereof. It is pointed out that the protecting cup 35 is held captive over the joint by means of a shoulder portion 48 formed in the leg attachment member 26, or other suitable means. A vertical through bore 49 also extends from the abutment face 32 of the leg attachment member 26 for receiving the tubular bushing 42 and pin 34 and pin 34 therein.

In order to arrest the swiveling of the leg attachment member with the intermediate housing, there is provided an arresting means in the form of a jaw member 50 which is pivotally secured to the leg attachment member 26 by a removable fastener 51. The jaw member has a pair of U-shaped fingers 52 and 52' which each define an arresting arm 53 and 53' and a throat portion 54. The jaw members are movable from a nonengageable position, as shown at 50 in FIG. 2, to an engaged position, as shown at 50' in FIG. 2. In the engaged position the arresting arms 53 and 53' are disposed on a respective one of opposed sides 30' of the intermediate housing 30 to restrain swiveling movement. The throat portion 54 of the jaw member 50 accommodates the passage or prevents obstruction with the protective cup 35.

The suspension portion 37 of the intermediate housing 30 comprises a helical spring receiving cavity 55 extending substantially transverse to the support surface 31. A through slot 56 extends across the cavity, and along the longitudinal axis of the cavity. A helical spring 57 is disposed within the cavity 55. A bolt receiving bushing 58, having a spring positioning post 59, is fitted in the lower end 57' of the spring, and is provided with a through bore 60 through which a removable fastener 61 extends. This fastener 61 also extends through the wheel axle housing 36 in aligned through bores 62 provided therein with the bolt 61 extending within the through slot 56. Thus, the damping is provided along the slot 56 and the entire damping assembly can be removed for servicing, repair or cleaning by simply removing the fastener 61 which has a lock nut 63 secured to a threaded end thereof.

As shown in FIG. 3, the wheel axle housing 36 is provided with an extension portion 65 having an axle through bore 66 for receiving the wheel axle 67 therethrough. The wheel axle is constituted by an elongated bolt having a threaded end 68 to which a lock nut 69 is also secured. Accordingly, the axle 67 is easily removed from the wheel axle housing 36 for further servicing or replacement of the wheels 70 secured thereby. The extension portion 65 also secures a brake member 71 thereto, which does not form part of the present invention.

It is within the ambit of the present invention to provide any obvious modifications of the preferred embodiment described herein, provided such modifications fall within the scope of the appended claims.

We claim:

1. A dismantlable wheel attachment mechanism using threaded type fasteners for securing wheels to a child vehicle, such as a stroller or carriage, such that said mechanism is dismantlable by a user person, said mechanism comprising in combination a leg attachment member removably securable to a leg of said vehicle, an intermediate housing removably secured to said leg attachment member and having a laterally extending top support surface in mating frictional surface engagement with a complementary shaped laterally extending bottom abutment wall fo said leg attachment member to form a swivel joint therebetween to permit swiveling of said leg attachment member about a removable swivel post, an inverted cup having a circumferential side wall extending about and surrounding and covering said swivel joint for protecting said joint from foreign matter, said inverted cup having a top wall with an opening configured for removably receiving through said opening in close fit an outer peripheral portion of said abutment wall of said leg attachment member, a lubricant interposed between said laterally extending top support surface and said complementary shaped laterally extending bottom abutment wall to constitute a substantially sealed lubricated joint, and a wheel axle housing removably secured to a suspension portion of said intermediate housing.

2. A wheel attachment mechanism as claimed in claim 1 wherein said inverted cup is molded from plastics material.

3. A wheel attachment mechanism as claimed in claim 1 wherein said swivel post is a hollow tubular bushing extending vertically above said support surface, said intermediate housing being removably secured to said leg attachment member by a pivot pin extending into said tubular bushing, said pivot pin having a through bore adjacent a free end thereof for receiving a removable fastener extending therethrough and through said intermediate housing.

4. A wheel attachment mechanism as claimed in claim 1 wherein there is further provided swivel arresting means for preventing swiveling of said leg attachment member on said support surface.

5. A wheel attachment mechanism as claimed in claim 4 wherein said swivel arresting means is provided by a jaw member pivotally secured at one end to said leg attachment member, said jaw member having a pair of U-shaped fingers defining an arresting arm and a throat portion, said jaw member being movable from a nonengageable position to an engaged position where said arresting arms are disposed on a respective one of opposed sides of said intermediate housing to restrain swiveling movement, said throat portion accommodating the passage of said means protecting said joint.

6. A wheel attachment mechanism as claimed in claim 1 wherein said leg attachment member is provided with a sleeve portion to receive said leg of said vehicle, and one or more bolt fasteners having lock nuts extending across said sleeve portion through said leg for removably securing same.

7. A wheel attachment mechanism as claimed in claim 1 wherein said suspension portion of said intermediate housing comprises a helical spring receiving cavity extending substantially transverse to said support surface, a spring in said cavity, a through slot extending across said cavity along the axis of said spring, and a bolt fastener having a lock nut extending through said slot under a bottom end of said spring and through said wheel axle housing for removably securing said wheel axle housing to said intermediate housing and permitting vertical shock absorption along the length of said through slot.

8. A wheel attachment mechanism as claimed in claim 1 wherein said wheel axle housing is provided with an axle receiving through bore, said axle having one or more threaded lock fasteners for removing said wheels therefrom and said axle from said axle housing.

* * * * *